No. 610,449. Patented Sept. 6, 1898.
G. N. JEUNE.
VINE TRIMMER.
(Application filed Oct. 25, 1897.)
(No Model.)
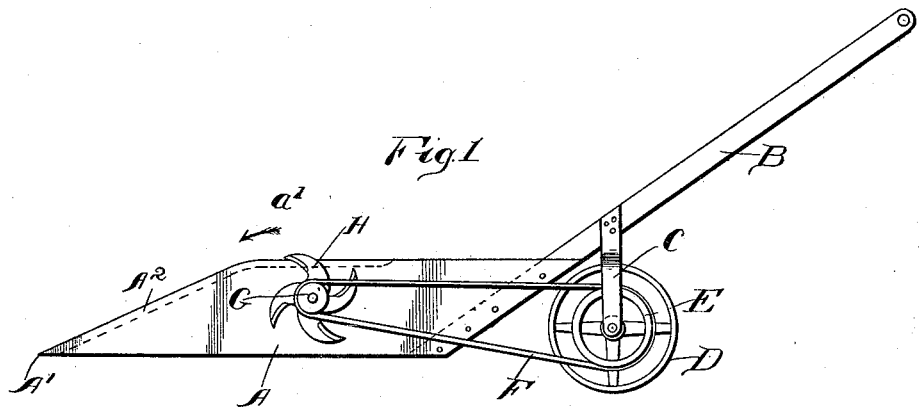
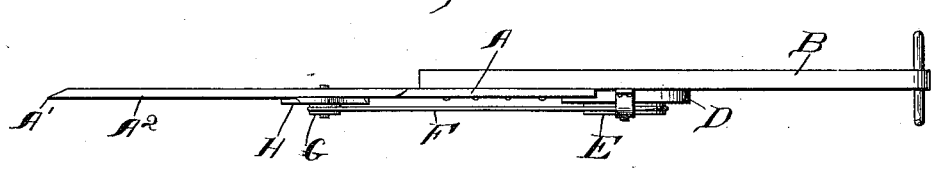
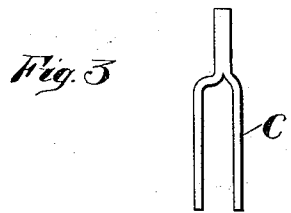
WITNESSES:
INVENTOR
G. N. Jeune.
BY
ATTORNEYS.
THE NORRIS PETERS CO., PHOTO-LITHO., WASHINGTON, D. C.

UNITED STATES PATENT OFFICE.

GEORGE NORMAN JEUNE, OF DEER WOOD, MINNESOTA.

VINE-TRIMMER.

SPECIFICATION forming part of Letters Patent No. 610,449, dated September 6, 1898.

Application filed October 25, 1897. Serial No. 656,316. (No model.)

*To all whom it may concern:*

Be it known that I, GEORGE NORMAN JEUNE, of Deer Wood, in the county of Crow Wing and State of Minnesota, have invented a new and Improved Vine-Trimmer, of which the following is a full, clear, and exact description.

The object of the invention is to provide a new and improved machine more especially designed for conveniently trimming strawberry and other vines or plants running close to the ground, the machine being simple and durable in construction and arranged to permit the user to conveniently move it over a field to cut rooted as well as exposed vines in a very simple manner.

The invention consists of certain parts and details and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a side elevation of the improvement. Fig. 2 is a plan view of the same, and Fig. 3 is an end elevation of the bracket for the pulley-shaft.

The improved machine is provided with a shear or blade A, formed at its forward end with a point A', from which extends upwardly and rearwardly a chisel-edge $A^2$ for readily cutting vines already rooted in the ground at the time the shear or blade is pushed forward, and the point A' passes under the vines for the edge $A^2$ to cut the vine held at both sides to the ground by its roots.

On the rear end of the shear or blade A is secured an upwardly and rearwardly extending handle B, adapted to be taken hold of by the operator to move the machine over the ground, and on the said handle is secured a depending bracket C, in which is journaled a wheel D, adapted to travel on the ground, with the lower end or bottom of the wheel below the lower edge of the shear or blade A when the latter is in a horizontal position, as indicated in Fig. 1.

On the wheel D is secured a smaller wheel E, somewhat less in diameter than the wheel D and connected by a belt F with a pulley G, secured to the outside of a revoluble cutter H, journaled on the outer face of the blade A, so that the cutting edges of the curved arms of the said cutter operate in conjunction with the top edge of the blade A and cut any vines passing between the said top edge of the blade and the corresponding cutting edge of the revoluble cutter H.

Now it will be seen that when the machine is moved forward over the ground by the operator pushing the handle B then the wheel D revolves and causes the wheel E to rotate, so that a like motion is transmitted from the said wheel by the belt F to the pulley G and the cutter H to rotate the latter in the direction of the arrow $a'$. Now as the machine is moved forward rooted vines near the ground are cut by the chisel-edge $A^2$, as previously explained, and other vines passing over the top edge of the blade are cut by the quickly-revolving cutter H, as before mentioned.

Thus it will be seen that by the use of the machine strawberry-beds can be readily trimmed of runners or other undesirable vines; but it is evident that the machine may be used for trimming other vines, if desired.

Having thus fully described my invention, I claim as new and desire to secure by Letters Patent—

A vine-trimmer comprising a shear or blade having substantially horizontal top and bottom edges and having its front and rear edges inclined upwardly and rearwardly, the forward end being formed with a point and having a beveled chisel-edge on the inclined forward end, the said cutting edge also extending along a portion of the top of the blade, a handle secured to the rear inclined end of the blade, a depending bracket secured to the handle at the rear of the blade and forked at its lower end, a wheel journaled in the members of the said bracket, a revoluble cutter journaled on one face of the blade and operating in conjunction with the cutting edge at the top of the blade and means for rotating the cutter from the wheel, substantially as shown and described.

GEORGE NORMAN JEUNE.

Witnesses:
JOSEPH RAYMOND,
MARY RAYMOND.